United States Patent Office 2,816,904
Patented Dec. 17, 1957

2,816,904

CHEMICAL PRODUCT

Alfred C. Haven, Jr., Wilmington, Del., assignor to E. I. du Pont de Nemours and Company, Wilmington, Del., a corporation of Delaware No Drawing. Application August 8, 1956,
Serial No. 602,896

1 Claim. (Cl. 260—439)

This invention relates to the new compound [(benzyloxyformamido)cyclopentadienyl](cyclopentadienyl)-iron.

Organo-metallic compounds in which the metal is directly attached to a hydrocarbon radical make up an important class of compounds. Well-known examples include tetraethyl lead, the ethyl mercury fungicidal compounds, and the alkyl and aryl derivatives of magnesium, sodium, lithium and the like which are useful in organic syntheses. The first such compound of iron to be discovered was dicyclopentadienyliron. This compound which is also known as bis-cyclopentadienyl iron is claimed in U. S. Patent No. 2,680,756.

It is an object of this invention to provide a new derivative of dicyclopentadienyliron which is useful as an antimicrobial agent and also as an intermediate in the preparation of the amino derivative of dicyclopentadienyliron.

The new compond of this invention, [(benzyloxyformamido)cyclopentadienyl](cyclopentadienyl)iron is a crystalline compound melting at 100–105° C. Its infrared absorption spectrum shows bands at 3.0, 5.9 and 6.45 microns. This componnd may also be described as the benzyl urethane of aminocyclopentadienyl(cyclopentadineyl)iron. It has the formula

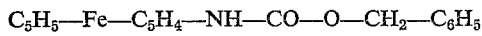

$C_5H_5-Fe-C_5H_4-NH-CO-O-CH_2-C_6H_5$

The point of attachment of the benzyloxyformamido radical to the cyclopentadiene nucleus is not known. According to the formulation of the dicyclopentadienyliron structure given by Wilkinson et al. in J. Am. Chem. Soc. 74, 2125 (1952), all five positions on each of the cyclopentadienyl rings are equivalent and hence only a single monosubstituted derivative is possible.

The product of this invention may be made by a series of reactions beginning with the carboxylic acid of dicyclopentadienyliron, which is disclosed and claimed in U. S. application Serial No. 312,853 of Weinmayr, filed October 2, 1952, now U. S. Patent No. 2,683,157. The carboxylic acid derivative may be converted by reaction with phosphorus pentachloride to the acid chloride, which is then reacted with sodium azide to yield the corresponding acid azide. Reaction of the azide with benzyl alcohol yields the desired [(benzyloxyformamido)cyclopentadienyl](cyclopentadienyl)iron.

The preparation of the compound of this invention is illustrated by the following examples:

EXAMPLE 1

Preparation of [(azidoformyl)cyclopentadienyl](cyclopentadienyl)iron 13.7 grams of the monocarboxylic acid of dicyclopenta-dienyliron are stirred with an equal weight of phosphorus pentachloride in 150 ml. dry benzene for two hours at room temperature. The suspension is filtered and concentrated in vacuo to remove the solvent and the phosphorus oxychloride. The residue is dissolved in 100 ml. of acetone and the resulting solution is cooled to 0 to 5° and treated with a solution of 4.0 g. of sodium azide in a few ml. of water. The reaction mixture is allowed to stand at room temperature for one-half hour and then poured into 600 ml. of cold water. The solid which precipitates is separated by filtration, pressed dry on the filter and then extracted with three 150 ml. portions of cold ether. The ether extracts are decolorized with activated charcoal, dried over magnesium sulfate and concentrated in vacuo at room temperature to give the desired product, which melts at 74–75°.

Analysis.—Calc'd for $C_{11}H_9FeON_3$: C, 51.80; H, 3.56; N, 16.48. Found: C, 50.8, 51.5, 52.4, 51.5; H, 3.44, 3.36, 3.49, 3.91; N, 16.5, 16.7, 16.8, 17.0.

The infra-red absorption spectrum shows strong absorption at 4.45 and 5.88 microns.

EXAMPLE 2

Preparation of [(benzyloxyformamido)cyclopenta dienyl](cyclopentadienyl)iron

A solution of 0.85 g. of [(azidoformyl)cyclopentadienyl](cyclopentadienyl)iron in 15 ml. of benzyl alcohol is heated gradually in an oil bath to 200°, the process requiring about 45 minutes. There is a noticeable gas evolution at 100–150°. The solution is concentrated in vacuo to an oil which crystallizes on stirring in a mixture of ether and petroleum ether to give material melting at 100 to 105°. After two recrystallizations from a mixture of ether and petroleum ether the [(benzyloxyformamido)cyclopentadienyl](cyclopentadienyl)iron had a melting point of 112–113° C.

Analysis.—Calc'd for $C_{18}H_{17}NO_2Fe$: C, 64.5; H, 5.11; N, 4.18. Found: C, 63.7, 63.9; H, 5.18, 5.32; N, 4.6, 4.9.

The infra-red absorption spectrum shows bands at 3.0, 5.9 and 6.45 microns.

The compound of this invention may readily be converted to aminocyclopentadienyl(cyclopentadienyl)iron by hydrolysis or by hydrogenation. This latter compound is described and claimed in my U. S. application Serial No. 365,556 filed July 1, 1953. The [(benzyloxyformamido)cyclopentadienyl](cyclopentadienyl)iron is a useful antimicrobial agent as well as being a useful intermediate in the formation of the amino derivative. The amino compound is itself a useful intermediate in the formation of dyestuffs and in forming other derivatives through reactions involving the amino group. It is well known that amines, particularly primary amines, are useful for a wide variety of purposes such as bases, reaction with fatty acids to form soaps, in organic syntheses, removal of $CO_2$ from inert gases, softening and moistening agents, acid gas absorbents, solvents, dispersing agents, plasticizing agents, medicinals, rubber accelerators and inhibitors, and in the manufacture of dyestuffs ("Chemical Week," November 1, 1952, Part Two, page 143); and as catalysts in the polymerization of liquid formaldehyde, in which the primary amines are most effective ("Formaldehyde" by Walker, page 94, published in 1944 by Reinhold). The amino compound, derived from the compound of this invention, is a primary amine and, in general, is inherently useful for purposes similar to analogous amino compounds and for the preparation of compounds similar to those prepared from analogous amines. For example, the amino dicyclopentadienyliron compound is a base, may be reacted with fatty acids to form soaps, may be used to remove $CO_2$ from inert gases and as an acid gas absorbent, and as an intermediate for dyestuffs, such as those obtained by diazotizing the amino group and coupling or by coupling the amino compound with a diazonium salt, by methods well known to the art.

The aminocyclopentadienyl(cyclopentadienyl)iron is also useful to improve the ignition and combustion characteristics of normally liquid hydrocarbon fuels. When incorporated in a motor fuel for spark ignition engines, it functions as an anti-knock agent and, in the presence of tetraethyl lead, further improves the anti-knock characteristics of the fuel. When incorporated in a fuel oil, it materially improves the combustion characteristics of such oils, greatly decreasing their tendency to form soot in the exhaust gases and to form solid carbonaceous deposits in the combustion apparatus. For example, when aminocyclopentadienyl(cyclopentadienyl)iron was incorporated in a fuel oil, having a tendency to form substantial amounts of carbon on combustion, in a proportion of 0.0108 gram/100 ml. of fuel oil and 250 ml. of the mixture was burned in a combustion chamber at the rate of 150 ml. per hour with an air flow of 1040 cu. ft. per hour, it formed only 9 mg. of deposits in the combustion chamber. On the other hand, when the same fuel oil, without any added compound, was burned in the same amount in the same combustion chamber under the same conditions, it formed 314 mg. of deposits in the combustion chamber.

This is a continuation-in-part of my copending application Serial No. 365,557 filed July 1, 1953, now abandoned.

The embodiments of the invention in which an exclusive property or privilege is claimed are defined as follows:

[(Benzyloxyformamido)cyclopentadienyl](cyclopentadienyl)iron.

No references cited.